United States Patent [19]

Ward

[11] 4,010,010
[45] Mar. 1, 1977

[54] GAS-VAPOR SEPARATION PROCESS AND APPARATUS WITH LOW ENERGY CONSUMPTION

[75] Inventor: Dennis J. Ward, South Barrington, Ill.

[73] Assignee: Universal Oil Products Company, Des Plaines, Ill.

[22] Filed: Mar. 17, 1975

[21] Appl. No.: 559,277

[52] U.S. Cl. .................................. 55/37; 55/49; 55/51; 55/208; 62/17; 208/343; 208/344
[51] Int. Cl.[2] .................................. B01D 3/26
[58] Field of Search ............ 55/37, 49, 51, 85, 89, 55/222, 208; 203/42, 39, 49; 208/343, 344, 345; 62/17, 20; 202/158

[56] References Cited
UNITED STATES PATENTS

| | | | |
|---|---|---|---|
| 2,337,254 | 12/1943 | Legatski et al. | 55/51 X |
| 2,497,421 | 2/1950 | Shiras | 62/17 X |
| 2,742,103 | 4/1956 | Adams | 55/49 X |
| 2,826,266 | 3/1958 | Hachmuth | 62/17 |
| 2,880,591 | 4/1959 | Kwauk | 55/49 X |
| 2,970,451 | 2/1961 | Ehrlich et al. | 55/49 X |
| 3,232,027 | 2/1966 | Lorenz et al. | 55/51 X |

Primary Examiner—Frank W. Lutter
Assistant Examiner—N. Greenblum
Attorney, Agent, or Firm—James R. Hoatson, Jr.; Robert W. Erickson; William H. Page, II

[57] ABSTRACT

Process and apparatus for the separation of gaseous and vaporous constituents from a feed containing the same. Vaporous feed components are absorbed into multiple primary lean absorber liquids and a secondary lean absorber liquid through contact between the feed and the absorber liquids in a multistage absorption zone. Gaseous feed components are withdrawn from the absorption zone. Rich absorber liquid is passed to a multistage stripping zone where gaseous feed components dissolved within the rich absorber liquid are removed and returned to the absorption zone. Stripped liquid, containing vaporous feed components, but being essentially free from gaseous feed components, is withdrawn from the stripping zone. Multiple and discrete primary lean absorber liquids are withdrawn from separate stages of the stripping zone and passed to separate stages of the absorption zone.

7 Claims, 1 Drawing Figure

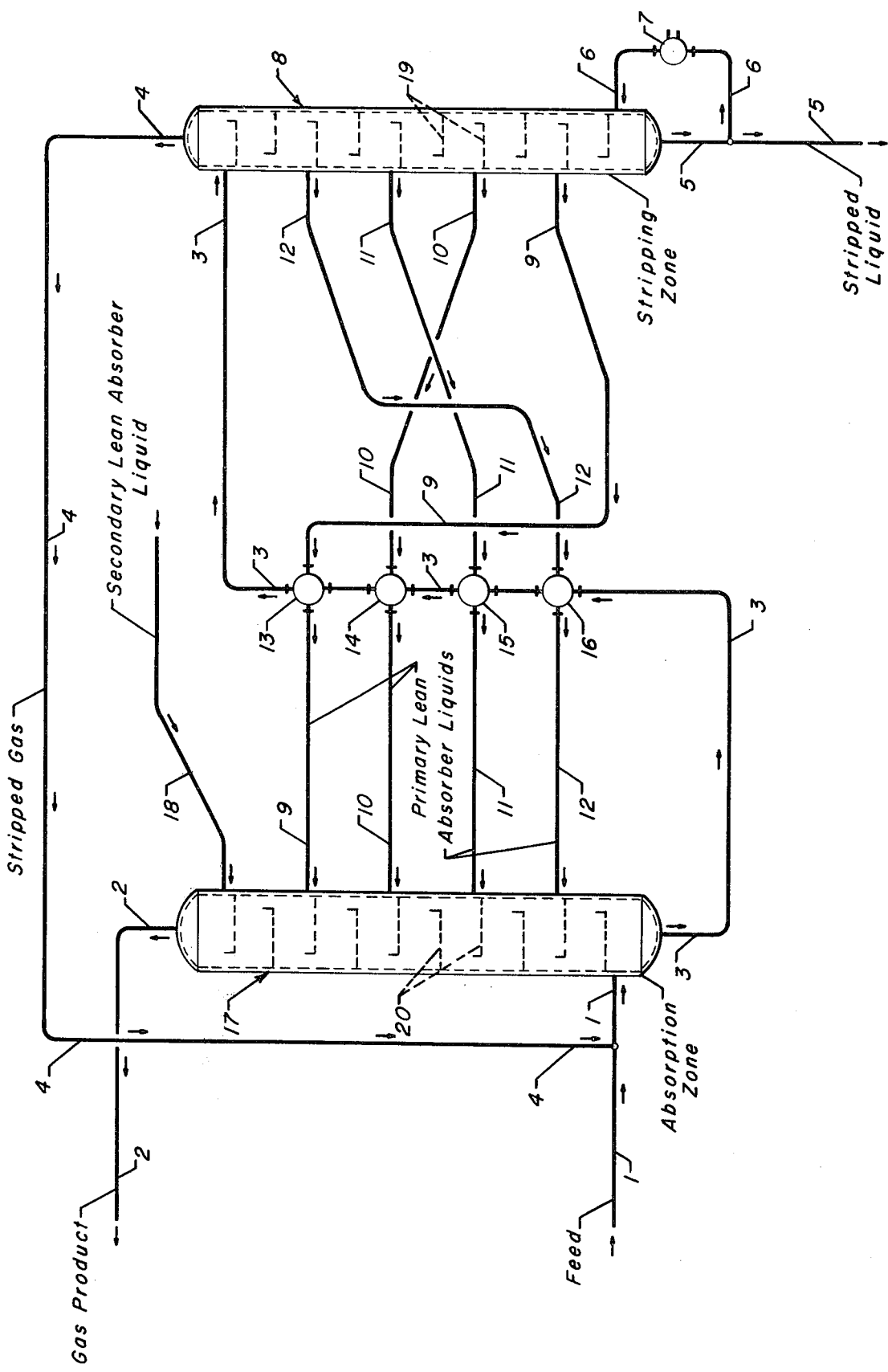

GAS-VAPOR SEPARATION PROCESS AND APPARATUS WITH LOW ENERGY CONSUMPTION

BACKGROUND OF THE INVENTION

1. Field of the Invention

The field of art to which this invention pertains is the recovery of vapors from gas-vapor mixtures. It particularly relates to the purification and recovery of desired vaporous constituents from feeds composed of vapors contaminated with undesirable gases.

2. Prior Art

Materials which are vaporous at normal conditions are employed in the synthesis of many chemical and petrochemical compounds. Ethylene, for example, is in demand as a starting material in the synthesis of alcohols and synthetic rubber. Propylene and butylenes are in particularly great demand for plastics manufacture and for conversion to high octane motor fuel blending components by polymerization and alkylation processes. Alcohols such as ethanol, propanol and butanol are also of paramount interest. Propane and butane are used extensively as LPG fuel.

Sources of these vaporous materials include such conversion processes as thermal cracking, catalytic cracking, reforming, hydrotreating, fermentation, hydrocracking, etc. The chemical reactions occurring in these processes produce commercially desirable quantities of vaporous materials, and because of their utility it is desirable to recover them in as high a concentration as possible. Unfotunately, these vapors are frequently contaminated by unwanted gaseous materials. In the case of LPG fuel, for example, the useful propane and butane vapors produced in a conversion process are frequently contaminated by hydrogen sulfide gas. For this reason, gas-vapor separation processes are commonly used to concentrate and recover these desirable vapors.

Gas-vapor separation processes currently in use are commonly comprised of two major sections or zones: absorption and stripping. In essence, these zones serve, respectively, to absorb all but the lightest gaseous components and to strip dissolved gases from the absorbed components so that gases are removed from the desired vapors. The major disadvantage of such prior art purification processes is their high energy consumption. I have discovered a process for vapor purification which by virtue of its lower energy consumption is an improvement over prior art processes.

OBJECTS AND EMBODIMENTS

It is an object of this invention to provide an improved method for the separation of vapors and gases.

It is another object of this invention to provide a method for separating a gas-vapor mixture into gaseous products and vaporous products in a more efficacious manner.

Yet another object of my invention is to provide an absorber-stripper for the separation of gases from mixtures of gases and vapors. In one embodiment, my invention affords a process for the continuous removal of gaseous constituents from a feed comprising gaseous and vaporous constituents which process comprises the steps of: (i) passing said feed, stripped gases, one or more primary lean absorber liquids, and a secondary lean absorber liquid to a multistage absorption zone; (ii) absorbing into said primary and secondary lean absorber liquids at least a part of said vaporous constituents of said feed within said absorption zone; (iii) withdrawing from said absorption zone a rich absorber liquid comprising said lean absorber liquids, absorbed vapors and absorbed gases; (iv) withdrawing from said absorption zone a gas stream comprising gaseous feed constituents; (v) passing said rich absorber liquid to a multistage stripping zone and therein stripping said absorbed gases from said rich absorber liquid; (vi) withdrawing said absorbed gases from said stripping zone as stripped gases and passing said stripped gases to said absorption zone; (vii) withdrawing each of said primary lean absorber liquids from a separate stage of said multistage stripping zone and passing each of said primary lean absorber liquids to a separate stage of said multistage absorption zone; and, (viii) withdrawing from said stripping zone a liquid stream substantially free from gaseous feed constituents, said second stream comprising said secondary lean absorber liquid and said absorbed vaporous feed constituents.

BRIEF SUMMARY OF THE INVENTION

The present invention involves a process for the recovery of vaporous components from a composite stream containing vaporous and gaseous components, such as an effluent stream from a hydrocarbon or other chemical conversion zone.

Multiple lean absorber liquids absorb normally vaporous components from the composite stream in an absorption zone. Resulting rich absorber liquid passes to a stripping zone where gases dissolved in the rich absorber liquid are removed and a stripped liquid, containing vaporous components from the composite stream, is produced. Gaseous components of the composite stream are withdrawn from the absorption zone. Multiple lean absorber liquids are selectively withdrawn from separate stages of the stripping zone and passed to separate stages of the absorption zone. Confinement of the circulation of absorber liquids to the absorption zone-stripping zone circuit, without further heating, cooling and fractionation in other processing zones, results in reduced consumption of energy in effecting the gas-vapor separation.

BRIEF DESCRIPTION OF THE DRAWING

An embodiment of the present invention is illustrated in the attached drawing. Only such details are included as are necessary for a clear understanding of my invention, and no intention is thereby made to unduly limit its scope. Certain items necessary to the operation of the process but unnecessary to its understanding, such as minor process streams, valves, pumps, instrumentation and other equipment have been omitted for the sake of simplicity.

The attached drawing shows a gas-vapor separation process having absorption zone 17 and stripping zone 8. A feed stream comprising normally vaporous materials such as ethane, ethanol, propane, etc., and normally gaseous materials such as hydrogen, methane, etc. enters absorption zone 17 through conduit 1. Primary lean absorber liquids enter absorption zone 17 through conduits 9, 10, 11, and 12. A secondary lean absorber liquid enters absorption zone 17 in conduit 18. The lean absorber liquids pass, thence, downwardly through the absorption zone. The primary and secondary lean absorber liquids contact the rising gaseous and vaporous feed components upon contact stages 20. Vaporous feed components are absorbed into the lean absorber liquids which exit absorption zone 17 in conduit 3 as rich absorber liquid. Gaseous feed components which are not absorbed exit absorption zone 17 in conduit 2 as a gas product.

Rich absorber liquid, containing the vaporous feed components and a portion of the gaseous feed components, passes in conduit 3 to heat exchangers 16, 15, 14 and 13 where heat is absorbed by the rich absorber liquid. After heat absorption the rich absorber liquid in conduit 3 passes to stripping zone 8. Stripping zone 8 has reboiler 7 which boils liquid therein to generate stripping vapors. Stripping vapors rise within the stripping zone and contact, upon contact stages 19, the descending rich absorber liquid. Gaseous feed components in the descending rich absorber liquid are thereby removed from the rich absorber liquid and are withdrawn from the stripping zone in conduit 4 as stripped gas. Stripped gas is reintroduced to absorption zone 17, such as via conduit 1, intermixing therein with feed.

Primary lean absorber liquids are withdrawn from contact stages 19 within stripping zone 8, exiting in conduits 9, 10, 11 and 12. These primary lean absorber liquids, each withdrawn from a separate contact stage, pass to heat exchangers 13, 14, 15 and 16 respectively and are cooled therein prior to passage to absorption zone 17.

Stripped liquid exits stripping zone 8 in conduit 5. A portion of the stripped liquid exits conduit 5 in conduit 6 and passes to reboiler 7. Reboiler 7 partially vaporizes the stripped liquid therein, and the partially vaporized stripped liquid then returns to stripping zone 8 in conduit 6. The stripped liquid remaining in conduit 5 is withdrawn from the process. The withdrawn stripped liquid comprises absorber liquid and absorbed vaporous feed components and is essentially free from gaseous feed components.

DETAILED DESCRIPTION OF THE INVENTION

The production of chemical products such as fertilizer, foodstuffs and the like and the refining of petroleum involve numerous treating, refining and conversion processes. These processes are well known to those skilled in the art and need not be discussed in great detail herein. However, a characteristic of these processes and many others to be found in petroleum refineries and chemical plants is the production of components which are broadly referred to herein as vapors, or vaporous, and others which are referred to as gases, or gaseous. Vaporous materials are materials which at a specific set of conditions of temperature and pressure exist in a vapor state not far removed from liquefaction. Gaseous materials are materials which may be said to be vapors in the strictest sense, however, they are materials which are greatly removed from the liquid and solid states at the conditions in question. This nomenclature is best explained by an example. When speaking of vaporous and gaseous materials one must refer to a specific set of conditions of temperature and pressure. For example, at conditions of 1 atmosphere pressure and 60° F temperature we would speak of n-butane as a vapor because at these conditions n-butane is not far removed from liquefaction, liquefaction occurring by a reduction in temperature from 60° F to 31° F. Hydrogen at 1 atmosphere pressure and 60° F temperature would, however, be spoken of as a gas because, although hydrogen is vaporous at these conditions, a reduction to −423° F would be necessary to cause liquefaction. Hydrogen is, therefore, quite far removed from the liquid or solid states. The present invention broadly provides a method for separating the effluent from any petroleum refining, hydrocarbon conversion, chemical conversion, chemical treating or other process which contains the types of components which are referred to herein as vaporous and gaseous.

For illustrative purposes, the present invention will be described with reference to the effluent from a hydrocarbon cracking process. Vaporous and gaseous materials from a hydrocarbon cracking conventionally leave in the vapor and liquid streams from the fractionation zone of the unit. These streams are sent to a gas-vapor separation process for recovery of hydrocarbon vapors and gases in states of relative purity, that is, relatively exclusive of contamination of one by the other. The hydrocarbon vapor from the separation process typically comprises hydrocarbons having 3 or 4 carbon atoms per molecule and includes such compounds as propane, butylenes and the like. This vapor is commonly liquefied in subsequent processing steps. Liquefied hydrocarbon vapor is commonly referred to in the art as liquefied petroleum gas, or LPG. This product may be further processed in downstream fractionation facilities if it is desired to produce further purified hydrocarbon product streams such as, for example, streams substantially comprising hydrocarbons of only 3 carbon atoms, 4 carbon atoms, etc. The gas stream from the separation process commonly contains compounds such as $H_2S$, $H_2$, methane and ethane. These light components are valuable primarily as fuel and are conducted from the separation process to a fuel system. Prior art gas-vapor separation processes have been characterized by their high energy consumption. A large stream of liquid is commonly countercurrently contacted with the gas-vapor portion of the feed, absorbing the vapors and carrying them subsequently through stripping and fractionation zones before returning for further absorption. The pumping, heating and cooling of the large liquid stream through the fractionation zone consumes large quantities of energy. My invention eliminates a significant portion of the energy consumption of the prior art processes.

I have discovered that an economical and efficient separation of gases and vapors can be effected by using a combined absorber-stripper system which utilizes, as the bulk of the absorber liquid, plural discrete streams of liquid withdrawn from separate stages of the stripper and injected into separate stages of the absorber. This provides a circuit of liquid circulation which largely does not include downstream fractionation zones and therefore avoids expense of energy there.

As is well known in the art, a stripper is generally a multistage contact vessel which provides rising vapors to transfer a volatile component from a falling liquid phase into the vapors. An absorber is generally a multistage contact vessel to do the reverse, that is, a falling liquid contact phase is provided to dissolve a soluble component from a rising vapor phase. Prior art gas-vapor separation processes generally use an extraneous liquid, one taken from a downstream processing zone or zones, as the absorbing liquid in the absorber. I have discovered that the liquid falling within the stripper of an absorber-stripper combination is adequate for use in place of most of the extraneous absorbing liquid.

The technical characteristics of stripping operations are well known in the art, and it is unnecessary to include such teachings here. However, attention is directed to the relative flow rates and compositions of the liquid in the various stages of a stripper, particularly from feed inlet to the stripped liquid outlet. Rich absorber liquid enters the top of a conventional stripping tower and passes downwardly, traversing the various contact stages and contacting vapors rising therein. The liquid flow rate within a given stage is generally lower than the stage above, but the vapor rate throughout the stages changes little. Because of the resultant lower ratio of stripping vapor to liquid at the top of the vessel when compared to that at the bottom of the vessel, the liquid is better stripped at lower points in the vessel than at higher points. Therefore, the best mode of use of my invention is to use liquid from lower stripping stages as the absorbing liquid for upper stages in the absorber. It is also highly advantageous to exchange heat from the liquid streams withdrawn from the stripper to the rich absorber liquid stream. This is because absorber liquids have higher absorption capacities at lower temperatures and because heat must be provided in the stripper to generate the vapors necessary for stripping. The order of the heat exchange is also important to the utmost utility of my invention. The rich absorber liquid should absorb heat first from the uppermost liquid withdrawn from the stripper and lastly with the lowermost. This is because the temperature of the liquid within the stripping stages increases when passing from an upper stage to a lower one.

In the embodiment of the gas-vapor separation process of my invention shown in the attached drawing the aforementioned admixture of vaporous hydrocarbons and gases enters near the bottom of absorption zone 17 through conduit 1. Absorption zone 17 may be one or more vertically disposed plate or packed absorption towers, having a total of 10 or more contact stages. The absorption zone is maintained at conditions selected to absorb at least a portion of the soluble vaporous components of the feed into the liquid within the absorption zone. These conditions include a pressure of from about one atmosphere to 2000 psig and a temperature of from about 0° F to 500° F. Since absorption is normally exothermic, it may be necessary to provide one or more heat removal means to prevent heat buildup. The heat removal means can be a system, such as those well known in the art, which removes liquid from an otherwise overheated stage within the absorption zone, pumps this liquid through a cooling device and returns the cooled liquid to the stage immediately below. Liquid flowing downward within the absorption zone, flowing countercurrently to upward-flowing feed vapors and gases, is provided by streams of lean absorber liquid. These streams are referred to as being lean because they are substantially less than saturated with vaporous feed components. In flowing downwardly through the absorption zone, the lean absorber liquids absorb vaporous feed components and a small portion of soluble gaseous feed components. Combined lean absorber liquids and absorbed vaporous and gaseous feed components exit absorption zone 17 in conduit 3 and are collectively referred to as rich absorber liquid. Gases which have not been absorbed by the lean absorber liquids are withdrawn from the top of absorption zone 17 in conduit 2 as a gas product. Rich absorber liquid withdrawn from absorption zone 17 in conduit 3 is introduced near the top of stripping zone 8.

It is desired that the hydrogen, H₂S, methane and ethane from the feed exit the separation process as gases in conduit 2 and that the propane, propylene, butanes and butylenes exit the process as absorbed vapors. Ideally, therefore, the rich absorber liquid entering stripping zone 8 would contain none of the gaseous hydrogen, H₂S, methane or ethane. However, a portion of the hydrogen, methane and ethane in the feed is unavoidably absorbed in the rich absorber liquid. The stripping zone removes these absorbed gases. Stripping zone 8 may be a conventional, vertically disposed plate or packed tower provided with heat input means to furnish the heat for stripping. These heat input means may be a conventional kettle reboiler or other such device. The stripping tower should preferably have 10 or more contact stages. Rich absorber liquid passed to the stripping tower preferably enters above the uppermost contact stage of the stripper. Vapor generated through the boiling of liquid in the heat input means flows upwardly in the stripping zone and countercurrently contacts the rich absorber liquid. The rectification which ensues enriches the vapor phase in the gaseous components such that material withdrawn from stripping zone 8 in conduit 4, referred to as stripped gas, contains substantially all of the hydrogen, H₂S, methane and ethane which entered stripping zone 8 with the rich absorber liquid. Because the stripped gas also contains some vaporous materials it is returned to the absorption zone in conduit 4 in this example via conduit 1 and passed to absorption zone 17 with the feed. In this manner the vaporous materials which have unavoidably been stripped from the rich absorber liquid may be recovered, and the gaseous material in the stripped gas may leave the absorption zone in conduit 2. Rich absorber liquid, after being stripped of absorbed gases in stripping zone 8, is referred to as stripped liquid and exits stripping zone 8 in conduit 5. This stripped liquid contains vaporous feed components essentially free from gaseous feed components.

The drawing shows my invention's particularly useful and novel manner of provision of lean absorber liquid to the absorption zone. Primary lean absorber liquids, those first contacting the feed, are withdrawn in conduits 9, 10, 11 and 12 from separate contact stages 19 within the stripping zone. These individual streams are passed in reverse order to heat exchangers 13, 14, 15 and 16 for exchange of heat at progressively higher temperatures with the rich absorber liquid in conduit 3 and are passed to separate stages 20 in the absorption zone. It should be noted that the order of exit of lean absorber liquid from the stripping zone is the reverse of the order of inlet of the lean absorber liquid into the absorption zone. Secondary lean absorber liquid is introduced into the absorption zone above the top absorption stage. A suitable secondary lean absorber liquid may be any liquid which is substantially unsaturated with gaseous feed components and has a substantial solubility for vaporous feed components, such as the liquids used in prior art processes for the whole lean absorber liquid requirement. In the case of the foregoing example, this stream might be a stabilized gasoline from the bottom of a downstream fractionator used to separate vaporous feed components from the stripped liquid.

The flow rates, temperatures and pressures to be used in the separation process of my invention depend entirely upon what components are to be separated. Design of absorption and stripping towers, involving vapor-liquid equilibrium relations for the subject system, liquid and vapor handling capacities of equipment of the type being considered and determinations of the required number of contact stages, is well within the abilities of those skilled in the art.

Reasonable variation and modification are possible within the scope of the foregoing disclosure, the drawing and the claims to the invention without departing from the spirit thereof.

I claim as my invention:

1. A process for the continuous removal of gaseous constituents from a feed comprising gaseous and vaporous constituents which process comprises the steps of:
 i. passing said feed, stripped gases, a plurality of primary lean absorber liquids, and a secondary lean absorber liquid to a multistage absorption zone;
 ii. absorbing into said primary and secondary lean absorber liquids at least a part of said vaporous constituents of said feed within said absorption zone;
 iii. withdrawing from said absorption zone a rich absorber liquid comprising said lean absorber liquids, absorbed vapors and absorbed gases;
 iv. withdrawing from said absorption zone a gas stream comprising gaseous feed constituents;
 v. passing said rich absorber liquid to a multistage stripping zone and therein stripping said absorbed gases from said rich absorber liquid;
 vi. withdrawing said absorbed gases from said stripping zone as stripped gases and passing said stripped gases to said absorption zone;
 vii. withdrawing each of said primary lean absorber liquids from a separate stage of said multistage stripping zone and passing each of said primary lean absorber liquids to a separate stage of said multistage absorption zone; and,
 viii. withdrawing and recovering from said stripping zone a liquid stream substantially free from gaseous feed constituents, said liquid stream comprising secondary lean absorber liquid and absorbed vaporous feed constituents.

2. The process of claim 1 further comprising contacting said feed within said absorption zone primarily with said primary lean absorber liquids and subsequently with said secondary lean absorber liquid.

3. The process of claim 1 wherein said secondary lean absorber liquid is essentially free from gaseous feed constituents.

4. An absorber-stripper for recovery of vaporous components from a feed containing gaseous and vaporous components which comprises in combination:
 i. a vertically oriented multistage absorber vessel, having a lower inlet for absorber feed and stripped gas, an upper inlet for secondary lean absorber liquid, a top outlet for a gas product, a bottom outlet for rich absorber liquid and vertically spaced intermediate inlets for primary absorber liquid;
 ii. a vertically oriented multistage stripper vessel, having means for heat input situated in a lower part of said stripper vessel, a bottom outlet for stripped liquid, a top outlet for stripped gas, an upper inlet for rich absorber liquid and vertically spaced intermediate outlets for primary absorber liquid, the number of said intermediate outlets of said stripper vessel corresponding to the number of said intermediate inlets of said absorber vessel;
 iii. conduits communicating said absorber liquid outlets in said stripper vessel with said absorber liquid inlets in said absorber vessel;
 iv. a conduit communicating said bottom outlet of said absorber vessel with said upper inlet of said stripper vessel; and,
 v. a conduit communicating said top outlet of said stripper vessel with said lower inlet of said absorber vessel.

5. The absorber-stripper of claim 4 further characterized in that said intermediate absorber liquid outlets of the stripper vessel are connected to said intermediate absorber liquid inlets of the absorber vessel in reverse order with respect to the height of said vessels.

6. An absorber-stripper for recovery of vaporous components from a feed comprising gaseous and vaporous components which comprises in combination:
 i. an absorber vessel of vertical orientation having a plurality of plate or packed stages, a lower inlet for absorber feed and stripped gas, a top outlet for a gas product, an upper inlet for secondary lean absorber liquid, 4 intermediate inlets for primary lean absorber liquid, each of said intermediate inlets situated at a separate one of said plurality of stages in said absorber vessel and a bottom outlet for rich absorber liquid;
 ii. stripper vessel of vertical orientation having a plurality of plate or packed stages, a top outlet for stripped vapor, an upper inlet for rich absorber liquid, four intermediate outlets for secondary lean absorber liquid, each of said intermediate outlets situated at a separate stage in said stripper vessel, means for introduction of heat situated in a lower part of said stripper vessel and a bottom outlet for stripped liquid;
 iii. a first conduit communicating said bottom outlet of said absorber vessel with said upper inlet of said stripper vessel, said first conduit having a series of four heat exchange means situated therein;
 iv. a second conduit communicating said top outlet of said stripper vessel with said lower inlet of said absorber vessel;
 v. a third conduit communicating the lowermost-situated outlet of said intermediate outlets of said stripper vessel with the first heat exchange means of said series of heat exchange means, said first heat exchange means being situated in said first conduit adjacent to said upper inlet of said stripper vessel, said third conduit also communicating said first heat exchange means with the uppermost-situated inlet of said intermediate inlets of said absorber vessel;
 vi. a fourth conduit communicating the uppermost-situated outlet of said intermediate outlets of said stripper vessel with the second heat exchange means of said series of heat exchange means, said second heat exchange means being situated within said first conduit adjacent said rich absorber liquid outlet of said absorber vessel, said fourth conduit also communicating said second heat exchange means with the lowermost-situated of said intermediate inlets of said absorber vessel;
 vii. a fifth conduit communicating the next to uppermost-situated outlet of said intermediate outlets of said stripper vessel with the third heat exchange means of said series of heat exchange means, said third heat exchange means being situated adjacent said second heat exchange means in said first conduit, said fifth conduit also communicating said third heat exchange means with the next to lowermost-situated inlet of said intermediate inlets of said absorber vessel; and, viii. a sixth conduit communicating the next to lowermost-situated outlet of said intermediate outlets of said stripper vessel with the fourth heat exchange means of said series of heat exchange means, said fourth heat exchange means being situated adjacent said first heat exchange means in said first conduit, said sixth conduit also communicating said fourth heat exchange means with the next to uppermost-situated inlet of said intermediate inlets of said absorber vessel.

7. A process for the continuous removal of gaseous constituents from a feed comprising gaseous and vaporous constituents which process comprises the steps of:

a. introducing said feed into the lower portion and a secondary lean absorber liquid into the upper portion of a multistage absorption zone;

b. introducing separate streams of a primary lean absorber liquid into said zone at vertically spaced points thereof between the points of introduction of said feed and said secondary lean absorber liquid;

c. countercurrently contacting the feed with said absorber liquids in said zone to absorb gaseous and vaporous constituents of the feed in the liquids;

d. withdrawing resultant rich absorber liquid, comprising said primary and secondary absorber liquids, from the lower portion of the absorption zone and withdrawing unabsorbed gaseous constituents from the upper portion of said zone;

e. passing said rich absorber liquid from the lower portion of said zone to the upper portion of a multistage stripping zone and therein stripping absorbed gases from the rich absorber liquid;

f. withdrawing from vertically spaced points of said stripping zone separate streams of primary lean absorber liquid;

g. passing said separate streams from the stripping zone to said vertically spaced points of the absorption zone, the streams withdrawn from higher points of the stripping zone being introduced at lower points of the absorption zone; and h. withdrawing and recovering from the lower portion of said stripping zone a liquid stream substantially free of gaseous feed constituents and comprising said secondary lean absorber liquid and absorbed vaporous feed constituents.

* * * * *